Figure 1:
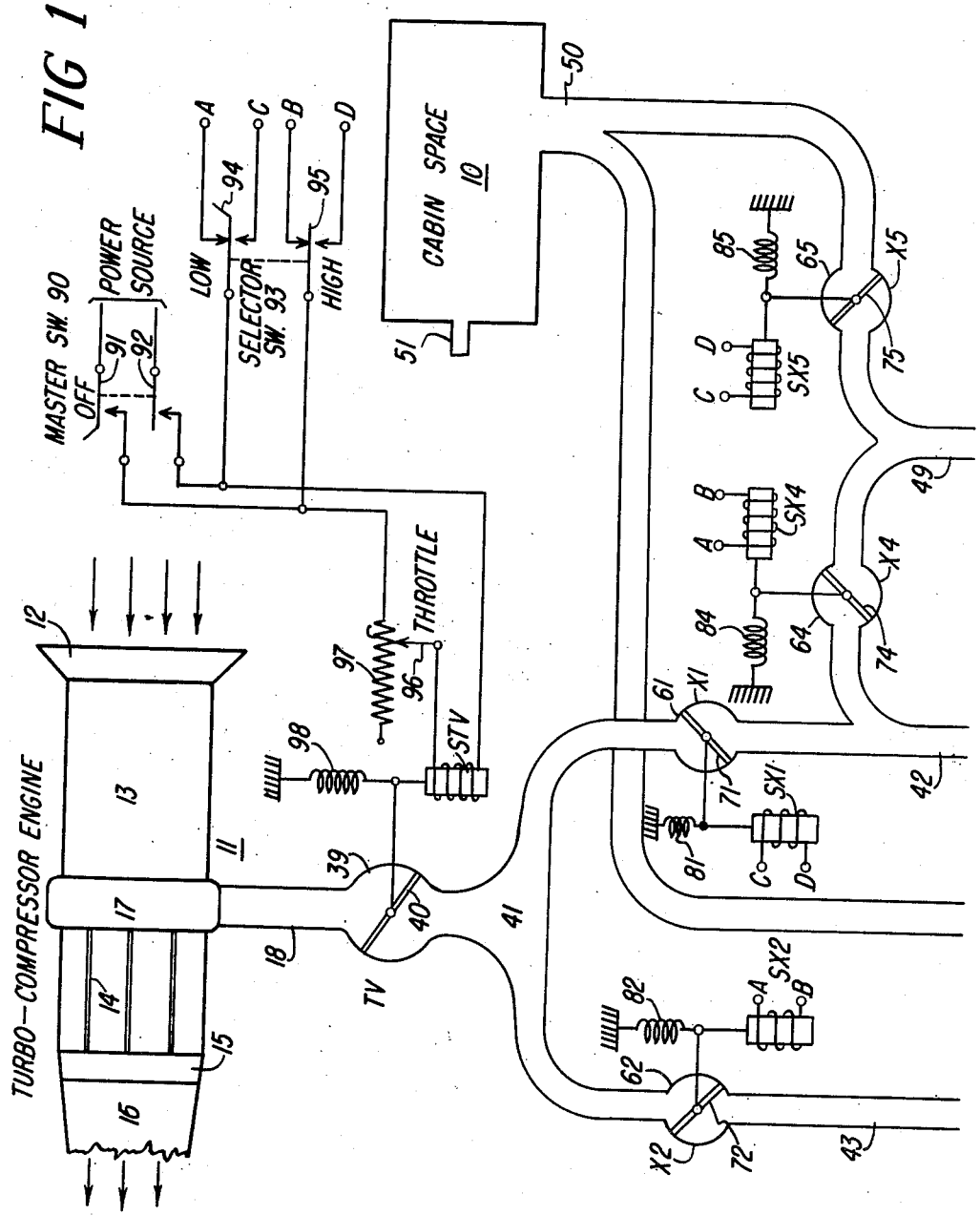

Oct. 23, 1956 R. S. HALL 2,767,562
CABIN PRESSURIZING AND REFRIGERATING SYSTEMS FOR AIRCRAFT
Filed Jan. 13, 1955 3 Sheets-Sheet 1

INVENTOR.
Russell S. Hall
BY Smith, Olsen, Baird
& Gulbrandsen,
Attys.

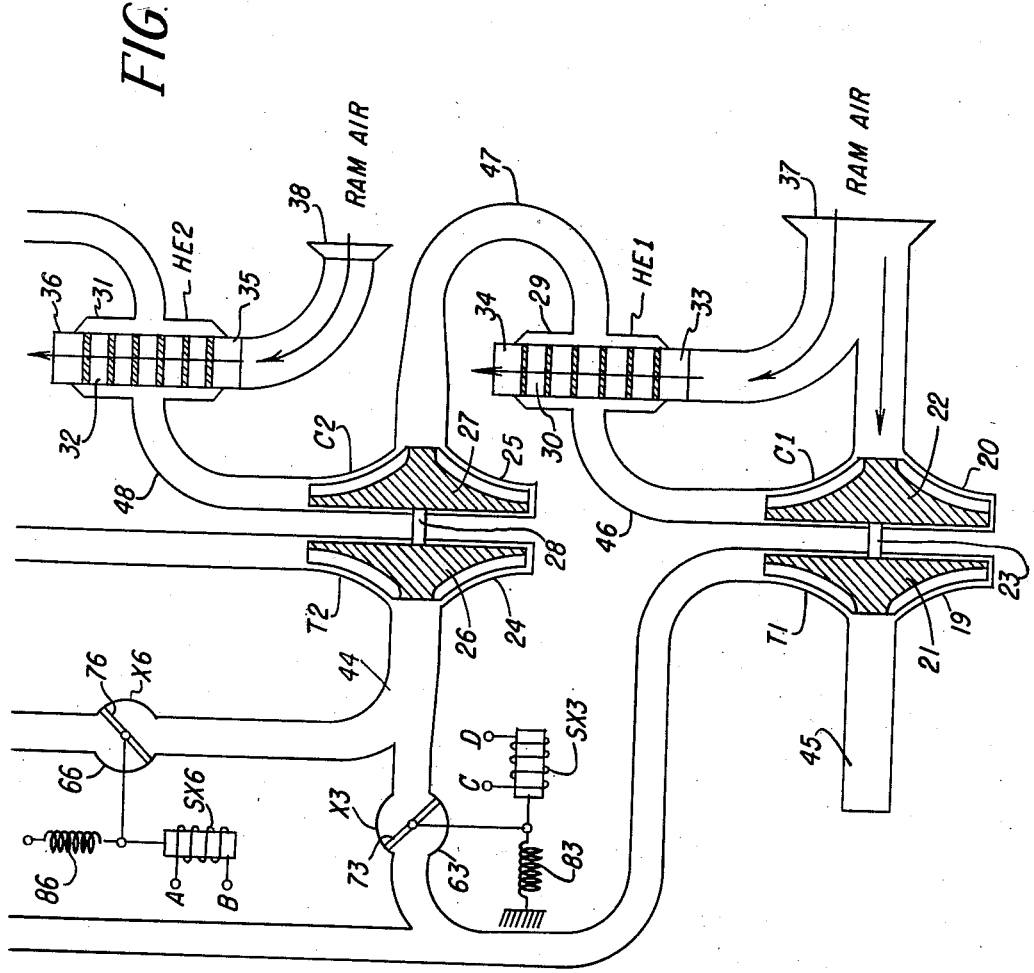

Oct. 23, 1956   R. S. HALL   2,767,562
CABIN PRESSURIZING AND REFRIGERATING SYSTEMS FOR AIRCRAFT
Filed Jan. 13, 1955   3 Sheets-Sheet 3
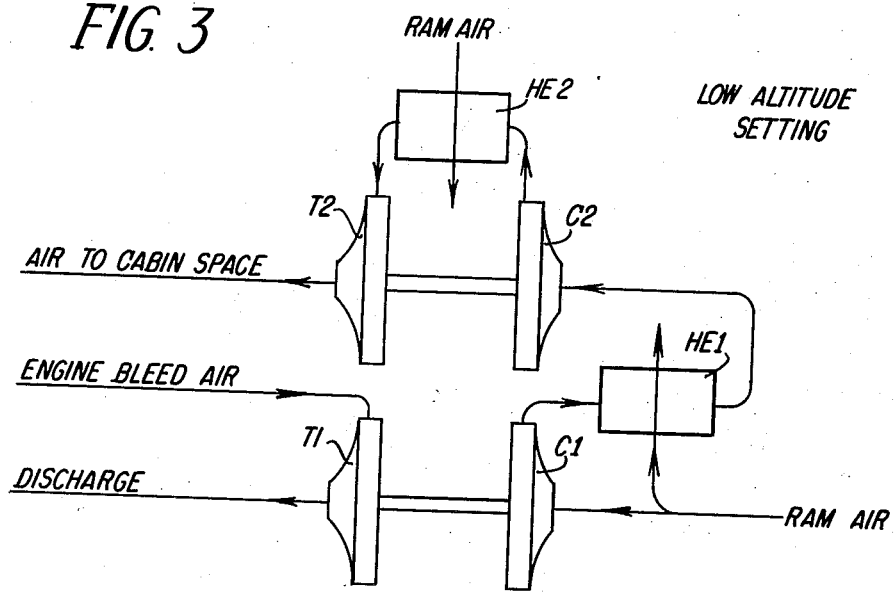
FIG. 3 — LOW ALTITUDE SETTING
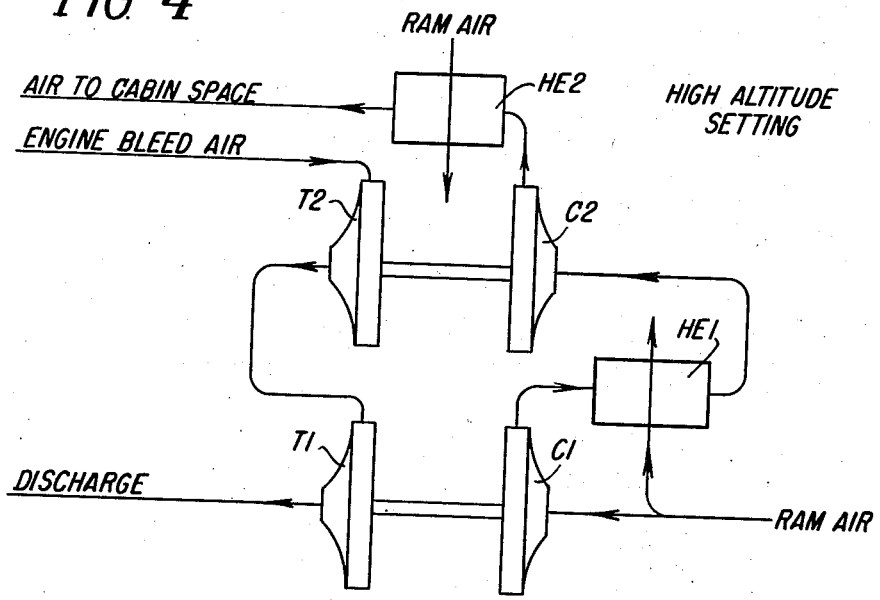
FIG. 4 — HIGH ALTITUDE SETTING
INVENTOR.
Russell S. Hall
BY Smith, Olsen, Baird
& Gilbrandsen, Attys.

United States Patent Office 2,767,562
Patented Oct. 23, 1956

2,767,562

CABIN PRESSURIZING AND REFRIGERATING SYSTEMS FOR AIRCRAFT

Russell S. Hall, Indianapolis, Ind., assignor to General Electric Company, a corporation of New York Application January 13, 1955, Serial No. 481,657

11 Claims. (Cl. 62—136)

The present invention relates to cabin pressurizing and refrigerating systems for aircraft, and more particularly to such systems for use in aircraft of the jet-propelled type.

In a conventional system for pressurizing and refrigerating the cabin space in an aircraft, compressed engine bleed air is employed to operate an air turbine that drives an air compressor that is employed to compress fresh air. The compressed fresh air is then passed through a cooler and combined in some proportion with the expanded engine bleed air, which combined air is then supplied to the cabin space for both pressurization and refrigeration purposes.

While this system is very simple in operation, it is subject to the serious criticism that under certain operating conditions of the engine obnoxious oil fumes and combustion gases become mixed with the engine bleed air and are thus introduced into the cabin space. Moreover, the arrangement does not permit of the desired flexibility of control and division between pressurization and refrigeration at respective low and high altitudes of the aircraft.

Accordingly, it is a general object of the invention to provide an improved and simplified pressurizing and refrigerating system for the cabin space of an aircraft that supplies only fresh air to the cabin space and that is exceedingly flexible with respect to the control and division between pressurization and refrigeration.

Another object of the invention is to provide a pressurizing and refrigerating system for the cabin space of an aircraft, comprising a pair of air turbine-air compressor units, a pair of air coolers, and an improved control arrangement for selectively setting this apparatus into respective low altiude and high altitude positions; wherein fresh air is subjected to a first compression step in a first of the air compressors and then to a first cooling step in a first of the air coolers followed by a second compression step in a second of the air compressors and then to a second cooling step in a second of the air coolers, in each position of the system; wherein compressed engine bleed air is supplied to drive a first of the air turbines, and the compressed fresh air is supplied from the second air cooler to drive a second of the air turbines and is then delivered to the cabin space, in the low altitude position of the system; and wherein compressed engine bleed air is supplied to drive the second and first air turbines in tandem relation, and the compressed fresh air is supplied directly to the cabin space, in the high altitude position of the system.

A further object of the invention is to provide in a pressurizing and refrigerating system of the character described, an improved control arrangement for converting the system between its low altitude and its high altitude positions in a simple and ready manner.

Further features of the invention pertain to the particular arrangement of the elements of the aircraft cabin pressurizing and refrigerating system, whereby the above-outlined and additional operating features thereof are attained.

The invention, both as to its organization and principle of operation, together with further objects and advantages thereof, will best be understood by reference to the following specification taken in connection with the accompanying drawings, in which:

Figures 1 and 2, taken together, are a diagrammatic illustration of an aircraft cabin pressurizing and refrigerating system embodying the present invention;

Fig. 3 is a schematic diagram of the low altitude setting of the system shown in Figs. 1 and 2; and Fig. 4 is a schematic diagram of the high altitude setting of the system shown in Figs. 1 and 2.

In order to form a unified diagram of the system, Figs. 1 and 2 should be arranged in respective upper and lower positions and disposed in the horizontal direction.

Referring now to Figs. 1 and 2 of the drawings, the aircraft cabin pressurizing and refrigerating system there illustrated, and embodying the features of the present invention, may be incorporated in an aircraft of the jet-propelled type including a cabin space, indicated diagrammatically at 10, and a turbo-compressor-jet engine 11 that is provided with an air intake manifold 12, an air compressor section 13, a fuel combustor section 14, a gas turbine section 15, and a thrust nozzle section 16. Also the engine 11 is provided with a compressed air bleed manifold 17 disposed between the air compressor section 13 and the fuel combustor section 14 and supplied with compressed engine bleed air in the operation of the engine 10; which manifold 17 supplies the compressed engine bleed air to a connected duct 18.

The system comprises a first air turbine T1 and a first air compressor C1 respectively provided with casings 19 and 20 rsepectively housing rotors 21 and 22 that are operatively connected together by a first shaft 23 extending therebetween; and a second air turbine T2 and a second air compressor C2 respectively provided with casings 24 and 25 respectively housing rotors 26 and 27 that are operatively connected together by a second shaft 28 extending therebetween. Also, the system comprises a first heat exchanger or cooler HE1 of the ram air type including a casing 29 provided with a number of tubes 30 through which the air to be cooled is passed and over which the cooling air is rammed in heat exchange relation; and a second heat exchanger or cooler HE2 of the ram air type including a casing 31 provided with a number of tubes 32 through which the air to be cooled is passed and over which the cooling air is rammed in heat exchange relation. In the heat exchanger HE1 the respective inlet and outlet ducts for the ram air are indicated at 33 and 34; and in the heat exchanger HE2 the respective inlet and outlet ducts for the ram air are indicated at 35 and 36. The inlet duct 33 communicates with a first ram air manifold 37 carried by the aircraft, while the outlet duct 34 communicates with the atmosphere. Similarly, the inlet duct 35 communicates with a second ram air manifold 38 carried by the aircraft, while the outlet duct 36 communicates with the atmosphere.

Connected to the compressed air supply duct 18 is a throttle valve TV that may be of any suitable type, the throttle valve TV being illustrated as being of the "butterfly" type only for the purpose of description; which throttle valve TV is provided with a casing 39 housing a valve element 40. In turn, the throttle valve TV communicates with the stem of a substantially T-shaped header 41 provided with two arms respectively connected to two valves X1 and X2. The valve X1 is connected to one leg of a substantially Y-shaped duct 42; and similarly the valve X2 is connected to one leg of a substantially Y-shaped duct 43; the stem of the duct 42 is connected directly to the inlet of the casing 24 of the air turbine T2, and the other leg thereof is connected to a valve X4. Similarly, the stem of the duct 43 is connected directly to the inlet of the casing 19 of the air turbine T1, and the other leg thereof is connected to a valve X3. The outlet of the casing 24 of the air turbine T2 is connected to a stem of a substantially Y-shaped duct 44, one leg of the duct 44 being connected to the valve X3, and the other leg thereof being connected to a valve X6. The outlet of the casing 19 of the air turbine T1 is connected to a duct 45 communicating directly with the atmosphere.

The ram air manifold 37 is branched, one of the arms thereof being connected to the ram air heat exchanger HE1, as previously noted, and the other arm thereof being connected to the inlet of the casing 20 of the air compressor C1. The outlet of the casing 20 of the air compressor C1 is connected by a duct 46 to the inlet of the casing 29 of the ram air heat exchanger HE1; while the outlet of the casing 29 of the ram air heat exchanger HE1 is connected by a duct 47 to the inlet of the casing 25 of the air compressor C2. The outlet of the casing 25 of the air compressor C2 is connected by a duct 48 to the inlet of the casing 31 of the ram heat exchanger HE2; while the outlet of the casing 31 of the ram air heat exchanger HE2 is connected to the stem of a substantially Y-shaped duct 49, the two legs of the duct 49 being respectively connected to the valve X4 and to a valve X5. The cabin space 10 is supplied with compressed refrigerated air via the stem of a substantially Y-shaped duct 50, one leg of the duct 50 being connected to the valve X5 and the other leg thereof being connected to the valve X6. Further, the cabin space 10 may be provided with an exhaust duct 51 communicating with the atmosphere so as to prevent undue pressure therein.

In the arrangement, the valves X1, X2, X3, X4, X5 and X6 may be of any suitable type and have been illustrated as being of the "butterfly" type only for purpose of description; whereby the valves noted respectively include casings 61 to 66, inclusive, respectively housing valve elements 71 to 76, inclusive; the valve elements 71 to 76, inclusive, being biased into their respective closed positions by associated coil springs 81 to 86, inclusive. Each of the valve elements 71, etc., may be operated into its open position by an associated electromagnetic solenoid; whereby the valve elements 71 to 76, inclusive, of the valves X1 to X6, inclusive, are provided with the respective operating electromagnetic solenoids SX1 to SX6, inclusive.

Finally, the system comprises a control arrangement including a master switch 90 provided with two blades 91 and 92 and operative into on and off positions, a selector switch 93 provided with two blades 94 and 95 and operative into low and high positions, and a throttle in the form of a wiper 96 cooperating with an associated resistor 97 and arranged to energize an electromagnetic operating solenoid STV operatively connected to the valve element 40 of the throttle valve TV. In the arrangement, the valve element 40 of the throttle valve TV is also biased into its closed position by an associated coil spring 98. The master switch 90 is connected to a suitable source of electric power. The selector switch 93 is of the two-position type, the blades 94 and 95 respectively engaging two contacts respectively terminating two conductors A and B when the selector switch 93 occupies its low position, and the blades 94 and 95 respectively engaging two other contacts respectively terminating two other conductors C and D when the selector switch 93 occupies its high position. The solenoids SX1 and SX3 and SX5 are bridged in parallel relation across the conductors C and D; while the solenoids SX2, SX4 and SX6 are bridged in parallel relation across the conductors A and B; and in the arrangement, the extension of the conductors A, B, C and D from the selector switch 93 to the various solenoids SX1, SX2, etc., has been omitted in the interest of clarity of illustration.

In the operation of the system, at low altitudes of the aircraft, it is normally desirable to achieve minimum pressurization and maximum refrigeration of the cabin space 10, whereas at high altitudes of the aircraft, it is normally desirable to achieve maximum pressurization and minimum refrigeration of the cabin space 10. Accordingly, when the master switch 90 occupies its closed position, the selector switch 93 is selectively operative into its low and high positions respectively to set the elements of the system into their respective low and high altitude positions to achieve the correlated pressurization and refrigeration of the cabin space 10, as noted above; and moreover, the amount of pressurization and refrigeration may be selectively controlled by the throttle 96, since selective operation thereof effects selective adjustment of the valve element 40 of the throttle valve TV from its closed position into its open position.

Considering now in greater detail the operation of the system, and assuming that it is to be placed into its low altitude setting, the selector switch 93 is operated into its low position, and then the master switch 90 is operated into its on or closed position; and then the throttle 96 is adjusted in order to adjust the degree of opening of the valve element 40 of the throttle valve TV obtaining the desired throttling of the compressed engine bleed air from the conduit 18 into the header 41. More particularly, closure of the master switch 90 completes the series circuit, including the solenoid STV, the wiper 96 and the associated resistor 97, so that adjustment of the wiper 96 with respect to the resistor 97 establishes the degree of energization of the solenoid STV and consequently the degree of opening of the throttle valve TV. With the selector switch 93 in its low position, the power source is connected to the conductors A and B so that the solenoids SX2, SX4 and SX6 are energized respectively operating the valve elements 72, 74 and 76 of the respective valves X2, X4 and X6 into their open positions. At this time, the system is set into its low altitude setting, as illustrated diagrammatically in Fig. 3.

More particularly, the compressed engine bleed air from the supply duct 18 is throttled through the throttling valve TV into the header 41 and then passes via the valve X2 and the duct 43 into the air turbine T1, and is then exhausted via the duct 45 to the atmosphere. Accordingly, the air turbine T1 is operated effecting operation of the air compressor C1. Fresh air is rammed via the ram air manifold 37 into the compressor C1 and also through the heat exchanger HE1. The fresh air is compressed in the air compressor C1 and then conducted via the duct 46 through the heat exchanger HE1, wherein it is cooled. The fresh air from the heat exchanger HE1 is conducted via the duct 47 into the air compressor C2, wherein it is further compressed and then discharged via the duct 48 into the heat exchanger HE2, wherein it is further cooled. The fresh air is cooled in the heat exchangers HE1 and HE2 by virtue of the streams of fresh air that are rammed therethrough via the respective ram air manifolds 37 and 38. The fresh air from the heat exchanger HE2 is conducted via the duct 49 through the valve X4 and via the duct 42 into the air turbine T2, wherein it is expanded effecting further cooling thereof. This expansion of the compressed air in the air turbine C2 not only drives the compressor C2, but it also effects "boot-strap" refrigeration or cooling thereof, as noted above. The fresh air then is exhausted from the air turbine T2 via the duct 44 through the valve X6 and thence via the fresh air supply duct 50 into the cabin space 10 bringing about both minimum pressurization and maximum refrigeration thereof, the fresh air in the cabin space 10 being exhausted therefrom to the atmosphere via the exhaust duct 51 for pressure control purposes with respect to the cabin space 10.

Recapitulating: In the low altitude setting of the system, only the air turbine T1 is directly driven by the engine bleed air from the compressed air supply duct 18, since the air turbine T2 is driven by the compressed fresh air preceding the supply thereof to the cabin space 10. Moreover, the fresh air that is taken in at the ram air manifold 37 is compressed and heated by the operation of the air compressor C1; then this compressed fresh air is cooled in the heat exchanger HE1; then this fresh air is further compressed and also heated by the operation of the air compressor C2; then this compressed fresh air is cooled in the heat exchanger HE2; and finally, this compressed fresh air is expanded as it operates the air turbine T2 effecting "boot-strap" cooling thereof prior to discharge into the cabin space 10; whereby the pressurization of the cabin space 10 is a minimum and the cooling or refrigeration thereof is a maximum. Now, of course, the degree of pressurization and refrigeration may be selectively controlled by selectively setting the throttle 96, as previously explained.

Considering further in greater detail the operation of the system, and assuming that it is to be placed into its high altitude setting, the selector switch 93 is operated into its high position, and then the master switch 90 is operated into its on or closed position; and then the throttle 96 is adjusted in order to adjust the degree of opening of the valve element 40 of the throttle valve TV obtaining the desired throttling of the compressed engine bleed air from the conduit 18 into the header 41. More particularly, closure of the master switch 90 completes the series circuit, including the solenoid STV, the wiper 96 and the associated resistor 97, so that adjustment of the wiper 96 with respect to the resistor 97 establishes the degree of energization of the solenoid STV, and consequently the degree of opening of the throttle valve TV. With the selector switch 93 in its high position, the power source is connected to the conductors C and D so that the solenoids SX1, SX3 and SX5 are energized respectively operating the valve elements 71, 73 and 75 of the respective valves X1, X3 and X5 into their open positions. At this time, the system is set into its high altitude setting, as illustrated diagrammatically in Fig. 4.

More particularly, the compressed engine bleed air from the supply duct 18 is throttled through the throttling valve TV into the header 41 and then passes via the valve X1 and the duct 42 into the air turbine T2, and is then exhausted via the duct 44 through the valve X3 and the duct 43 into the air turbine T2, and is then exhausted via the duct 44 through the valve X3 and the duct 43 into the air turbine T1, and is then exhausted via the duct 45 to the atmosphere. Accordingly, the air turbines T2 and T1 are operated in tandem relation effecting operation of the corresponding air compressors C2 and C1. Fresh air is rammed via the ram air manifold 37 into the compressor C1 and also through the heat exchanger HE1. The fresh air is compressed in the air compressor C1 and then conducted via the duct 46 through the heat exchanger HE1, wherein it is cooled. The fresh air from the heat exchanger HE1 is conducted via the duct 47 into the air compressor C2, wherein it is further compressed and then discharged via the duct 48 into the heat exchanger HE2, wherein it is further cooled. The fresh air is cooled in the heat exchangers HE1 and HE2 by virtue of the streams of fresh air that are rammed therethrough via the respective ram air manifolds 37 and 38. The fresh air from the heat exchanger HE2 is conducted via the duct 49 through the valve X5 and thence via the fresh air supply duct 50 into the cabin space 10 bringing about both maximum pressurization and minimum refrigeration thereof, the fresh air in the cabin space 10 being exhausted therefrom to the atmosphere via the exhaust duct 51 for pressure control purposes with respect to the cabin space 10.

Recapitulating: In the high altitude setting of the system, both the air turbine T2 and the air turbine T1 are directly driven in tandem relation by the engine bleed air from the compressed air supply duct 18. Moreover, the fresh air that is taken in at the ram air manifold 37 is compressed and heated by the operation of the air compressor C1; then this compressed fresh air is cooled in the heat exchanger HE2; then this fresh air is further compressed and also heated by the operation of the air compressor C2; and finally this compressed fresh air is cooled in the heat exchanger HE2 and discharged into the cabin space 10; whereby the pressurization of the cabin space 10 is a maximum and the cooling or refrigeration thereof is a minimum. Now, of course, the degree of pressurization and refrigeration may be selectively controlled by selectively setting the throttle 96, as previously explained.

Finally, operation of the system with regard to pressurization and refrigeration of the cabin space 10 may be arrested at any time by operation of the master switch 90 into its off or open position since this operation of the master switch 90 insures deenergization of all of the solenoids STV and SX1 to SX6, inclusive; whereby the throttle valve TV and the valves X1 to X6, inclusive, are restored into their closed positions.

In view of the above, it will be understood that the selective pressurization and refrigeration of the cabin space 10 may be selectively set, when the engine 11 is in operation, merely by selective control of the selector switch 93, when the master switch 90 occupies its closed position; whereas the degree of pressurization and refrigeration of the cabin space 10 may be selectively controlled at this time by selective setting of the throttle 96; all without reference to altitude of the aircraft, although, as previously mentioned, normally the system is set into its respective low altitude setting and high altitude setting when the aircraft respectively occupies low altitudes and high altitudes. The arrangement is very advantageous in view of the circumstance that there is no intermixing of the compressed fresh air that is supplied to the cabin space 10 and the compressed engine bleed air that is derived from the engine 11, thereby eliminating any possibility that oil fumes or combustion gases originating in the engine 11 are transported into the cabin space 10.

In view of the foregoing, it is apparent that there has been provided an improved and simplified system for pressurizing and refrigerating the cabin space of an aircraft, particularly an aircraft of the jet-propelled type, that is simple in connection and arrangement and positive in operation, and that insures ready control of both the required pressurization and the required refrigeration of the cabin space, without any danger of the transportation thereinto of obnoxious fumes and gases from the aircraft engine.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a cabin pressurizing and refrigerating system for aircraft; the combination comprising a first duct communicating with said cabin, a second duct supplied with compressed gas, a first turbine and a first compressor operatively connected together, a second turbine and a second compressor operatively connected together, first and second coolers, means for supplying fresh air to the inlet of said first compressor, means connecting the outlet of said first compressor to the inlet of said first cooler, means connecting the outlet of said first cooler to the inlet of said second compressor, means connecting the outlet of said second compressor to the inlet of said second cooler, means connecting the outlet of said first turbine to the atmosphere, a controller selectively operative between first and second positions, means responsive to operation of said controller into its first position for connecting the outlet of said second cooler to the inlet of said second turbine and for connecting the outlet of said second turbine to said first duct and for connecting said second duct to the inlet of said first turbine, whereby said first turbine is driven by the compressed gas from said second duct and said second turbine is driven by the compressed fresh air from said second cooler effecting both expansion and further cooling thereof prior to delivery to said first duct, and means responsive to operation of said controller into its second position for connecting the outlet of said second cooler directly to said first duct and for connecting said second duct to the inlet of said second turbine and for connecting the outlet of said second turbine to the inlet of said first turbine, whereby both of said turbines are driven by the compressed gas from said second duct and the compressed fresh air is delivered from said second cooler directly to said first duct.

2. The system combination set forth in claim 1, wherein said means for supplying fresh air to the inlet of said first compressor includes ram air intake structure.

3. The system combination set forth in claim 1, wherein each of said coolers is of the ram air cooled type.

4. The system combination set forth in claim 1, and further comprising a throttling valve for selectively controlling the supply of compressed gas from said second duct either to the inlet of said first turbine or to the inlet of said second turbine.

5. The system combination set forth in claim 1, wherein said first turbine and said first compressor are directly connected together by a first shaft extending therebetween, and said second turbine and said second compressor are directly connected together by a second shaft extending therebetween.

6. In a cabin pressurizing and refrigerating system for aircraft; the combination comprising a first duct communicating with said cabin, a second duct supplied with compressed gas, a first turbine and a first compressor operatively connected together, a second turbine and a second compressor operatively connected together, first and second coolers, means for supplying fresh air to the inlet of said first compressor, means connecting the outlet of said first compressor to the inlet of said first cooler, means connecting the outlet of said first cooler to the inlet of said second compressor, means connecting the outlet of said second compressor to the inlet of said second cooler, said second compressor to the inlet of said second cooler, means connecting the outlet of said first turbine to the atmosphere, means including a first valve interconnecting the outlet of said second cooler and the inlet of said second turbine, means including a second valve interconnecting the outlet of said second cooler and said first duct, means including a third valve interconnecting said second duct and the inlet of said first turbine, means including a fourth valve interconnecting said second duct and the inlet of said second turbine, means including a fifth valve interconnecting the outlet of said second turbine and said first duct, means including a sixth valve interconnecting the outlet of said second turbine and the inlet of said first turbine, a controller selectively operative between first and second positions, means responsive to operation of said controller into its first position for opening said first and third and fifth valves and for closing said second and fourth and sixth valves, whereby said first turbine is driven by the compressed gas from said second duct and said second turbine is driven by the compressed fresh air from said second cooler effecting both expansion and further cooling thereof prior to delivery to said first duct, and means responsive to operation of said controller into its second position for opening said second and fourth and sixth valves and for closing said first and third and fifth valves, whereby both of said turbines are driven by the compressed gas from said second duct and the compressed fresh air is delivered from said second cooler directly to said first duct.

7. In a cabin pressurizing and refrigerating system for aircraft; the combination comprising a first duct communicating with said cabin, a second duct supplied with compressed gas, a first turbine and a first compressor operatively connected together, a second turbine and a second compressor operatively connected together, first and second coolers, means for supplying fresh air to the inlet of said first compressor, means connecting the outlet of said first compressor to the inlet of said first cooler, means connecting the outlet of said first cooler to the inlet of said second compressor, means connecting the outlet of said second compressor to the inlet of said second cooler, means connecting the outlet of said first turbine to the atmosphere, means including a first valve interconnecting the outlet of said second cooler and the inlet of said second turbine, means including a second valve interconnecting the outlet of said second cooler and said first duct, means including a third valve interconnecting said second duct and the inlet of said first turbine, means including a fourth valve interconnecting said second duct and the inlet of said second turbine, means including a fifth valve interconnecting the outlet of said second turbine and said first duct, means including a sixth valve interconnecting the outlet of said second turbine and the inlet of said first turbine, each of said valves being biased into its closed position, a controller selectively operative between first and second positions, means responsive to operation of said controller into its first position for opening each of said first and third and fifth valves, whereby said first turbine is driven by the compressed gas from said second duct and said second turbine is driven by the compressed fresh air from said second cooler effecting both expansion and further cooling thereof prior to delivery to said first duct, means responsive to operation of said controller into its second position for opening each of said second and fourth and sixth valves, whereby both of said turbines are driven by the compressed gas from said second duct and the compressed fresh air is delivered from said second cooler directly to said first duct.

8. The system combination set forth in claim 7, wherein each of said valves is of the electromagnetic-operated type, and said controller is in the form of an electric control switch.

9. In a cabin pressurizing and refrigerating system for an aircraft of the jet-propelled type including a turbo-compressor-jet engine, the combination comprising a first duct communicating with said cabin, a second duct supplied with compressed engine air from the compressor of said engine, a first turbine and a first compressor operatively connected together, a second turbine and a second compressor operatively connected together, first and second coolers, means for supplying fresh air to the inlet of said first compressor, means connecting the outlet of said first compressor to the inlet of said first cooler, means connecting the outlet of said first cooler to the inlet of said second compressor, means connecting the outlet of said second compressor to the inlet of said second cooler, means connecting the outlet of said first turbine to the atmosphere, a controller selectively operative between first and second positions, means responsive to operation of said controller into its first position for connecting the outlet of said second cooler to the inlet of said second turbine and for connecting the outlet of said second turbine to said first duct and for connecting said second duct to the inlet of said first turbine, whereby said first turbine is driven by the compressed engine air from said second duct and said second turbine is driven by the compressed fresh air from said second cooler effecting both expansion and further cooling thereof prior to delivery to said first duct, and means responsive to operation of said controller into its second position for connecting the outlet of said second cooler directly to said first duct and for connecting said second duct to the inlet of said second turbine and for connecting the outlet of said second turbine to the inlet of said first turbine, whereby both of said turbines are driven by the compressed engine air from said second duct and the compressed fresh air is delivered from said second cooler directly to said first duct.

10. In an aircraft including a cabin and an engine comprising a compressor; the combination comprising a first duct communicating with said cabin, a second duct supplied with compressed gas from said engine compressor, a third duct supplied with fresh air, a first turbine-first compressor unit, a second turbine-second compressor unit, first and second coolers, a first conduit for conducting the fresh air from said third duct via said first compressor and then via said first cooler and then via said second compressor and then via said second cooler and thence via said second turbine into said first duct in order to drive said second turbine, whereby the fresh air is subjected to tandem compression steps respectively followed by tandem cooling steps and is then subjected to an expansion-cooling step before it is supplied to said cabin, and a second conduit for conducting the compressed gas from said second duct via said first turbine to the atmosphere in order to drive said first turbine.

11. In an aircraft including a cabin and an engine comprising a compressor; the combination comprising a first duct communicating with said cabin, a second duct supplied with compressed gas from said engine compressor, a third duct supplied with fresh air, a first turbine-first compressor unit, a second turbine-second compressor unit, first and second coolers, a first conduit for conducting the fresh air from said third duct via said first compressor and then via said first cooler and then via said second compressor and then via said second cooler and thence via said second turbine into said first duct in order to drive said second turbine, whereby the fresh air is subjected to tandem compression steps respectively followed by tandem cooling steps and is then subjected to an expansion-cooling step before it is supplied to said cabin, a second conduit for conducting the compressed gas from said second duct via said first turbine to the atmosphere in order to drive said first turbine, a third conduit for conducting the fresh air from said third duct via said first compressor and then via said first cooler and then via said second compressor and thence via said second cooler into said first duct, whereby the fresh air is subjected to tandem compression steps respectively followed by tandem cooling steps before it is supplied to said cabin, a fourth conduit for conducting the compressed gas from said second duct via said second turbine and then via said first turbine to the atmosphere in order to drive said second and first turbines in tandem relation, a control device operable between first and second settings, and means responsive to operation of said control device into its first setting for opening said first and second conduits and for closing said third and fourth conduits and responsive to operation of said control device into its second setting for closing said first and second conduits and for opening said third and fourth conduits.

References Cited in the file of this patent
UNITED STATES PATENTS 2,491,462    Wood   ---------------- Dec. 13, 1949